Jan. 3, 1961  R. H. TRIMBLE  2,966,823
TRACKING TELESCOPE WITH DUAL FIELD OPTICAL SYSTEM
Filed Aug. 21, 1948  2 Sheets—Sheet 1

INVENTOR.
Richard H. Trimble
BY
Hubert E. Metcalf
ATTORNEY

United States Patent Office 2,966,823
Patented Jan. 3, 1961

2,966,823

TRACKING TELESCOPE WITH DUAL FIELD OPTICAL SYSTEM

Richard H. Trimble, Culver City, Calif., assignor to Northrop Corporation, a corporation of California Filed Aug. 21, 1948, Ser. No. 45,548

4 Claims. (Cl. 88—1)

My invention relates to optical systems, and, more particularly, to optical systems having both a narrow angle field and a wide angle field.

In star tracking systems utilized, for example, in conjunction with the automatic celestial navigation of vehicles such as aircraft, a telescope is used to focus the light from a star into an image deviation detector such as a scanner and a photocell, in order that the detector be able to detect a slight movement of the image away from a control point. The detector output is then used to initiate operation of a servo system attached to the telescope, to return the tracking axis to star sight line alinement thereby centering the image again on the control point.

The movement of the star image for a given angular movement of the telescope is greater, the greater the focal length of the telescope. Thus, tracking accuracy is increased with an increase in telescope focal length. Unfortunately, an increase in focal length decreases the width of the angular field over which the telescope and image detector can pick up a star to be tracked.

These antagonistic conditions might normally lead to a compromise between accuracy and width of image field. However, automatic star tracking in celestial navigation requires both accuracy and a wide star seeking field. It is an object of the present invention to provide a means and method of simultaneously obtaining accurate tracking and a wide angle image field, in order that relatively large star image deviations from a control point will not cause the star image to be "lost" by the tracking system.

In broad terms, the invention comprises the use of an optical system providing a primary field close to the control point where high accuracy of tracking is obtained, and also providing a wide angle secondary field in which the star image is present, even when there is far too much angular deviation of the tracking axis from the sight line to the star to maintain the star image in the primary field.

The following definitions will be of value in understanding the ensuing description of the invention:

*Telescope.*—An optical system capable of projecting an image of a star in a focal plane.

*Tracking axis.*—The optical axis of the telescope.

*Control point.*—Point where the star image lies in the optical axis of the telescope at or near the focal plane of the optical system.

*Sight line.*—Straight line from star to control point.

*Scanner.*—Rotating shutter, or equivalent, positioned in the path of the light beam at or near the image focal plane which, together with a cooperating light responsive electrical device feeding into a phase detector, constitutes an image detection system sensing and indicating image deviation direction from the control point.

*Image field.*—The entire field at or near the focal plane wherein the position of the star image can be sensed by the image detection system.

*Primary image.*—A star image having maximum response over the image field to angular movements of the tracking axis with respect to the sight line.

*Secondary image.*—A star image having minimum response over the image field to angular movements of the tracking axis with respect to the sight line.

*Primary field.*—An area of the image field including a portion immediately around the control point where maximum sensitivity and accuracy of image deviation detection is desired and over which the primary image moves.

*Secondary field.*—An area around the control point where the secondary image remains in the image field after displacement of the tracking axis from the slight line by an angle sufficient to move the primary image entirely out of the image field.

Two types of optical systems will be described herein as being capable of practicing the invention.

In one preferred system a Cassegrainian telescope, normally utilizing two mirrors, has a secondary mirror replaced by a combination lens and mirror which forms two star images in the image field. One of these images, the primary image, is formed by light reflected to the rear surface of the mirror-lens by the primary mirror, this light then being reflected to the image field by this rear surface, as in a conventional Cassegrainian system. To obtain this function, the rear surface of the mirror-lens is partially silvered. This latter optical path is of long focal length and therefore provides high tracking accuracy in the image field as long as this primary image remains therein. The other image, the secondary image, is formed by light from the star passing through the mirror-lens alone, thereby providing a short focal length in the optical system and for relatively large angular deviations of the tracking axis from the sight line during which the secondary image remains in the image field. When the primary image leaves the field, tracking is continued on the secondary image which still remains in the image field. Thus, both high tracking accuracy and a wide angle tracking field is attained.

A second preferred means by which the same results can be obtained is by the use of a Cassegrainian telescope utilizing conventional primary and secondary mirrors and in which a non-linear lens, such as a toroidal lens, is placed between the objective and the scanner. This lens is composed of two portions, a central portion which is linear and which has no effect on the incoming light beam, so that the primary image in the primary image field near the control point has maximum response to angular movements of the telescope, and an outer toroidal portion which can form a substantially radially stational secondary star image in the secondary field around the primary image field, over wide angular deviations of the tracking axis from the sight line. After the primary image has left the primary field, the secondary image appears in the secondary field. This latter image is then used to bring the star image back into the primary field where high tracking accuracy is possible. This can be done by the scanner and photocell response even though the secondary image is radially stationary, because the circumferential position of the secondary image will determine the direction of the centering movement of the telescope, and this centering movement will continue until the secondary image disappears from the secondary field and appears as the primary image in the primary field, and until this primary image is centered on the control point.

Thus, the only differences in the two systems are that in the mirror-lens system the primary and secondary fields are co-extensive, and two images are seen when image deviations from the control point take place. Both of these images move radially across the image field, the primary image faster, the secondary image slower, as angular deviation takes place.

In the toroidal system the secondary image, when in the secondary field, is substantially radially stationary under the same circumstances. In both systems, however, the circumferential position of the secondary image while in the secondary field indicates the direction the tracking axis has to be moved to register the tracking axis accurately with the sight line to place the primary image on the control point.

The end result in both cases is identical. When the telescope is first aimed in the direction of the star to be tracked, a wide field is necessary to bring the star into the image field especially if this aiming is done automatically as by a predetermined angular setting. Accurate tracking is then possible when the star image is brought into the primary field. Such an arrangement is also highly desirable in star tracking from moving vehicles subject to various unexpected accelerations, as once the star image has been lost by the scanner, it is highly improbable that it ever would be regained, and all automatic control of the vehicle over a predetermined course would be completely lost.

Other objects and advantages will be more clearly understood by reference to the drawings, in which.

Figure 1:
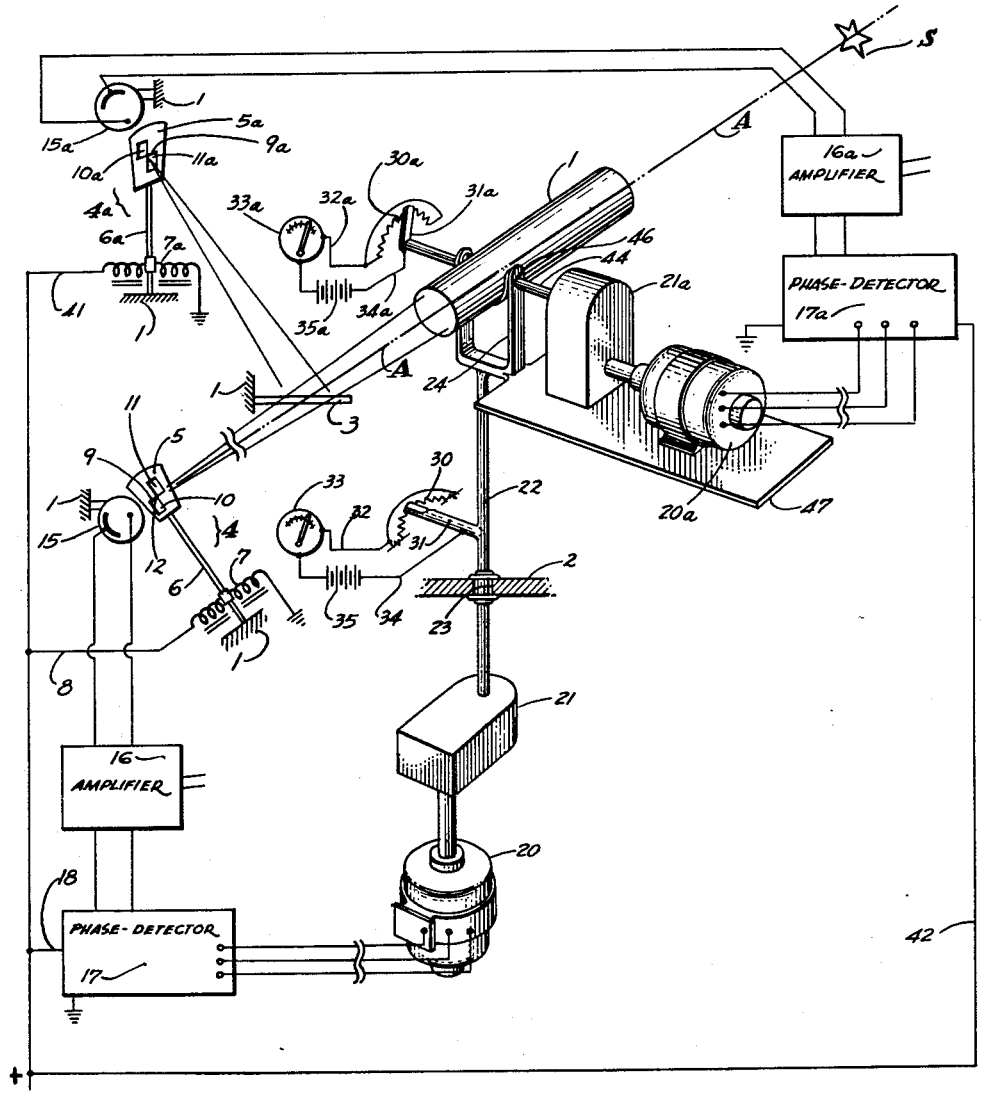
Figure 1 is a diagram of a star tracking system.

As shown in Figure 1, a telescope 1 is mounted on a platform 2 in a moving vessel for example, and is pointed in the direction of the light to be sought, such as light from a star S, to make the tracking axis A of the telescope generally coincident with the sight line to the star. The optical system (later described) of the telescope focuses an image of the star onto a light splitter 3 which in the embodiment illustrated reflects approximately half of the incident light at substantially a right angle to the tracking axis. The light rays that pass directly through the light splitter 3 are focused onto one of two image scanners which may be called the azimuth scanner 4. This azimuth scanner lies in a plane normal to the tracking axis of the telescope 1. The azimuth scanner is comprised of a small, sector-shaped, mostly opaque mask 5 with a flexible rod 6 attached to its inner radial side. The rod 6 is horizontally disposed and is rigidly attached to move with the body of the telescope 1. At an intermediate point along the rod 6 an electromagnet 7 is connected to vibrate the mask at a reference frequency in reference frequency line 8, in a plane parallel to the image focal plane of the telescope.

The line cut in the mask 5 by a vertical plane through the tracking axis of the telescope is called the control line 9 of the scanner. Windows 10 and 11 are cut in the opaque mask 5 to the right and left of the control line 9, respectively, and below and above the line, respectively, formed by the elongation of the vibrating rod 6 axis. The point where the windows touch is called the control point 12. Directly behind the mask, and also attached to move with the body of the telescope is positioned a photoelectric cell 15 which detects the position of the star image with respect to the control line.

The output from the photocell 15 is amplified by azimuth amplifier 16 and led to an azimuth phase detector 17 which is supplied with the same reference frequency as the azimuth scanner 4 through reference frequency line connection 18. Hence, by means well known to the art, energy initiated by photocell response is passed to an azimuth motor 20 to cause rotation in the proper direction through gear box 21 of a vertical azimuth shaft 22 supported by bearing 23 on platform 2 and connected to a yoke 24 supporting telescope 1. This mounting and connection enables the telescope 1 to be rotatable in azimuth in accordance with photocell response.

A means for indicating the azimuth angle is provided by a potentiometer resistance 30, only a portion of which is shown, having a contact arm 31 which is rigidly attached to vertical shaft 22 and adapted for movement therewith. The contact arm 31 is slidable over resistance 30, one extremity of which is connected by lead 32 to an ammeter 33 which may be calibrated for example as a function of telescope azimuth. The contact arm 31 is also connected to said ammeter by lead 34, there being a source of electric energy 35 in the last mentioned lead.

A second scanner which may be best described as an elevation scanner 4a is identical to the azimuth scanner 4 and is placed to receive the star image from the light reflected at substantially 90° from the light splitter 3. The plane of the elevation scanner is vertical and its control line 9a is parallel to the tracking axis of the telescope. Elevation scanner rod 6a is attached to move with the telescope body and is disposed perpendicular to the longitudinal axis thereof. Rod 6a also vibrates at reference line frequency, the latter being led to elevation electromagnet 7a through elevation line connection 41. Elevation scanner mask 5a has windows 10a and 11a above and below the control line respectively. These windows again so arranged that the lower right corner of the upper window touches the upper left corner of the lower window. As in the azimuth circuit, the elevation photocell 15a is positioned directly behind the scanner 4a. The output of the photocell 15a is amplified by elevation amplifier 16a and led to an elevation phase detector 17a which senses the direction of the movement of the image over scanner 4a, as it is also connected to the same reference frequency line as line 41 through elevation reference frequency wire 42. The elevation power motor 20a thus rotates in response to the output of the elevation phase detector 17a to drive elevation shaft 44 through elevation gear box 21a. Elevation shaft 44 rests in fork bearing 46 and is rigidly attached to telescope body 1 to produce a change in telescope elevation when rotated. A support 47 for the elevation motor 20a and gear box 21a is rigidly connected to yoke 24 to rotate in conjunction with the telescope 1 about a vertical axis.

The elevation indicating arrangement for the telescope is obtained by means of a potentiometer resistance analogous to the one previously described. Contact arm 31a, rigidly attached to elevation shaft 44, is slidable over resistance 30a. Lead 32a connects one end of the resistance to elevation ammeter 33a. Lead 34a connects the contact arm to the ammeter, there being a source of electric energy 35a in the latter lead.

By placing the control line of azimuth scanner 4 at right angles to the control line elevation scanner 4a, angular deviations in both azimuth and elevation of the scanning axis of the telescope, with respect to the sight line of a star, are sensed by the scanner device. The point where the two control lines cross is positioned in the tracking axis and thus may be termed the control point. The system is stable only when the star image coincides with the control point, and when light from a star reaches the photocells by the image moving away from the control point in any direction, the motors act in the proper direction to move the telescope back to the angle where the image is again on the control point.

The particular tracking system just above described is no part of the present invention, being shown, described and claimed in the copending application, Serial No. 81,226, filed March 14, 1949, and is shown and described herein merely as being illustrative of a particular device in which the optical system of the present invention can be utilized to advantage.

Two optical systems for use in telescope 1 are shown that provide an image field having both high image tracking accuracy and a wide angular field. These systems are diagrammatically shown in Figures 2 and 3.

Figure 2:
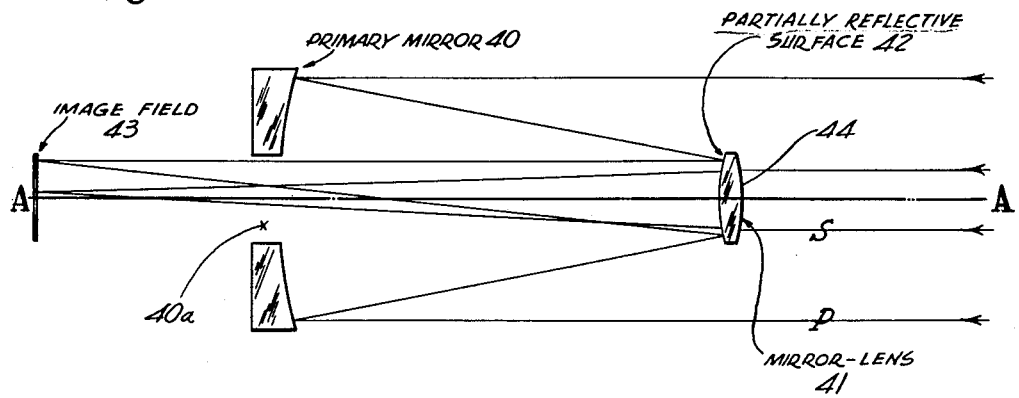
Figure 2 is an optical diagram showing the creation of a primary and secondary field by a mirror-lens used in a Cassegrainian reflecting telescope.

Referring first to Figure 2, a Cassegrainian system is shown having a primary concave mirror 40 having a central aperture 40a herein. Forward of said primary mirror and positioned symmetrically in the tracking axis A of the system, is a mirror-lens 41 having its rear surface 42 partially silvered, to reflect light received from the primary mirror 40 and shaped to focus that light in an image field 43 behind the primary mirror, the light passing through the aperture 40a. This light path is identical with that of a conventional Cassegrainian reflector and provides a primary image in the image field through an objective of relatively long focal length. This primary image, at or near the control point, gives the required accuracy of tracking control, but due to the relatively narrow angle of the field, the primary image will move out of the image field with relatively small angular displacements of the tracking axis from the sight line, and tracking control would then be lost.

However, mirror-lens 41 is provided with a front surface 44 contoured to cause the mirror-lens also to focus a star image in the image field 43. This can be done because the rear surface is silvered to provide partial light transmission. This secondary image is formed in a system having a relatively short focal length and therefore, this latter system has a relatively wide angle image field. Accordingly, after the primary image has passed out of the image field due to a telescope deviation, the secondary image will remain in the image field until it also passes out of the field. However, the field of the secondary optical system can be made sufficiently wide that the secondary image will remain in the field during the maximum deviations that can normally be expected to occur during use of the system. The light path for the primary image is labelled P, and for the secondary image S.

Figure 3:
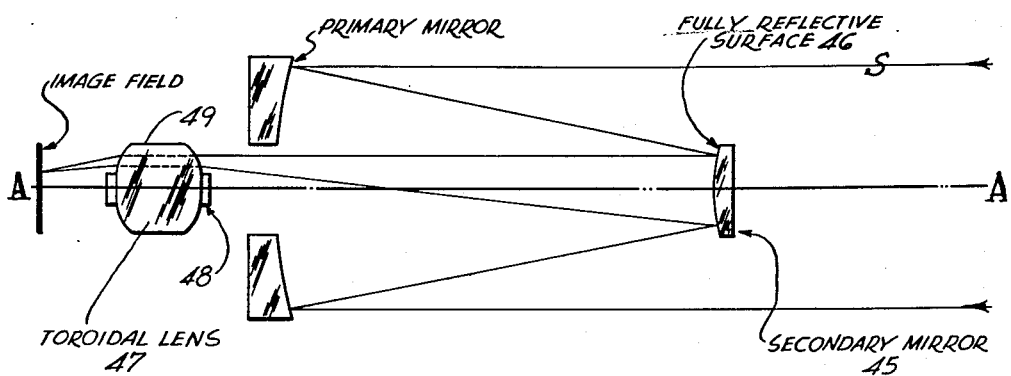
Figure 3 is an optical diagram showing the creation of a primary and secondary field by a toroidal lens used in a Cassegrainian reflecting telescope.

A similar field expansion is obtained in the optical system shown in Figure 3. This figure also shows a Cassegrainian reflector of the same focal length as that in the system shown in Figure 2, and differs only in the respect that a secondary mirror 45, having a rear surface 46 that is fully reflective, is used instead of mirror-lens 41, and that a toroidal lens 47 is positioned between the objective and the image field, preferably relatively close to the image field. The toroidal lens is composed of two portions, a central portion 48 that is linear and which has no effect on the incoming light beam, and through which the primary image is formed in the primary field, and an outer toroidal portion 49 that is nonlinear. This outer portion maintains a secondary star image in the secondary field over wide angular deviations of the tracking axis from the sight line, the image being substantially radially stationary but being in the proper direction from the control point. The only image path shown is the secondary image path S.

In this case, when the telescope is moved over an angle which moves the primary image out of the primary field, the secondary image appears in the secondary field, the scanner senses the deviation and returns the image toward the control point. As the tracking axis approaches the sight line the primary image reappears in the primary field and the scanner continues to operate to center the primary image on the control point.

Thus, in both instances, high tracking accuracy is obtained at and near the control point, with a wide angle field available in which the secondary image appears after the primary image has left the central portion of the image field. In both instances, only the secondary image appears in the entire image field when the primary image disappears.

These two optical systems have slight differences. In the mirror-lens system, the primary and secondary images are not as bright, due to the light splitting at the partially reflective surface 42. However, the primary field is the same width as the total image field, so that the scanner can work on the primary image over an angle as determined by the width of the entire field. In the toroidal lens system, the image is of full light value, but the primary field is small, being substantially less than the entire field width. The choice of the system to be utilized will, therefore, be influenced by the type of scanner utilized, the magnitudes of the stars to be tracked, etc., but in both systems the tracking accuracy will be the same for the same focal length of the Cassegrainian reflecting system at and near the control point.

While the present invention has been described as being ideally adapted for use in star tracking systems, it will be understood that the invention will also be useful in any device where a narrow angle field and a wide angle field are simultaneously required in the same optical system.

What is claimed is:

1. An optical system of the Cassegrainian type suitable for use in tracking a distant source of light, comprising a centrally apertured concave primary mirror positioned to directly receive light rays from said source, a double convex lens coaxially positioned in front of said primary mirror in the path of light from said mirror reflected from said source, said lens being smaller in diameter than said primary mirror, an image field coaxially positioned behind said primary mirror, the rear surface of said lens being partially light-reflective and partially light-transmissive, the optical axis of said primary mirror being coincident with the optical axis of said lens, the focal plane of light from said source through said lens and through the aperture in said primary mirror being at said image field, and the focal plane of light from said source reflected from said mirror onto said lens rear surface and reflected from said rear surface through said aperture also being at said image field, whereby two real images of a point on said source lying just off the optical axis of said system are simultaneously formed on said image field over paths having different focal lengths.

2. In a light source tracking system, an optical system of the Cassegrainian type comprising a centrally apertured concave primary mirror positioned to directly receive light rays from said source, a double convex lens coaxially positioned in front of said primary mirror in the path of light from said mirror reflected from said source, said lens being smaller in diameter than said primary mirror, an image field coaxially positioned behind said primary mirror, the rear surface of said lens being partially light-reflective and partially light-transmissive, the optical axis of said primary mirror being coincident with the optical axis of said lens, the focal plane of light from said source through said lens and through the aperture in said primary mirror being at said image field, and the focal plane of light from said source reflected from said mirror onto said lens rear surface and reflected from said rear surface through said aperture also being at said image field, whereby two real images of a point on said source lying just off the axis of said optical system are simultaneously formed on said image field over paths having different focal lengths, and means positioned at said image field for sensing departure of said images from said optical system axis.

3. Apparatus in accordance with claim 2 wherein said sensing means includes means for determining the direction of departure of said images.

4. Apparatus in accordance with claim 2 including means for moving said optical system in response to said sensing means to bring back said images to said optical system axis.

References Cited in the file of this patent

UNITED STATES PATENTS

| | | |
|---|---|---|
| 940,137 | Eppenstein | Nov. 16, 1909 |
| 1,290,777 | O'Brien | Jan. 7, 1919 |
| 2,278,505 | Zapp | Apr. 7, 1942 |
| 2,386,614 | Kaprelian | Oct. 9, 1945 |
| 2,401,705 | Mihalyi | June 4, 1946 |
| 2,409,186 | Bouwers | Oct. 15, 1946 |
| 2,504,383 | Bouwers | Apr. 18, 1950 |
| 2,513,367 | Scott | July 4, 1950 |

FOREIGN PATENTS

| | | |
|---|---|---|
| 269,447 | Germany | Jan. 22, 1914 |
| 350,651 | Germany | Mar. 21, 1922 |
| 352,035 | Great Britain | June 22, 1931 |